United States Patent
Busey et al.

(10) Patent No.: US 6,785,708 B1
(45) Date of Patent: Aug. 31, 2004

(54) METHOD AND APPARATUS FOR SYNCHRONIZING BROWSE AND CHAT FUNCTIONS ON A COMPUTER NETWORK

(75) Inventors: Andrew T. Busey, Austin, TX (US); Gerald H. Weghorst, Jr., Austin, TX (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 08/741,470

(22) Filed: Oct. 30, 1996

(51) Int. Cl.[7] .............................................. G06F 15/16
(52) U.S. Cl. ..................................... 709/204; 709/227
(58) Field of Search ................................ 709/204, 205, 709/206, 207, 227

(56) References Cited

U.S. PATENT DOCUMENTS

| | | |
|---|---|---|
| 4,837,798 A | 6/1989 | Cohen et al. |
| 4,914,586 A | 4/1990 | Swinehart et al. ........... 364/200 |
| 5,276,679 A | 1/1994 | McKay et al. ................ 370/84 |
| 5,287,103 A | 2/1994 | Kasprzyk et al. ....... 340/825.52 |
| 5,297,249 A | 3/1994 | Bernstein et al. ........... 395/156 |
| 5,481,666 A | 1/1996 | Nguyen et al. .............. 395/159 |
| 5,506,984 A | 4/1996 | Miller ......................... 395/600 |
| 5,528,671 A | 6/1996 | Ryu et al. ..................... 379/93 |
| 5,530,852 A | 6/1996 | Meske, Jr. et al. .......... 395/600 |
| 5,537,546 A | 7/1996 | Sauter .................... 395/200.01 |
| 5,539,886 A | 7/1996 | Aldred et al. .......... 395/200.04 |
| 5,550,906 A | 8/1996 | Chau et al. |
| 5,572,643 A | 11/1996 | Judson ........................ 395/793 |
| 5,617,565 A | 4/1997 | Augenbraun et al. ....... 395/604 |
| 5,619,650 A | 4/1997 | Bach et al. ............ 395/200.01 |
| 5,668,863 A | 9/1997 | Bieselin et al. |
| 5,764,916 A | * 6/1998 | Busey et al. ................ 709/227 |
| 5,796,393 A | * 8/1998 | MacNaughton et al. .... 709/203 |
| 5,828,839 A | * 10/1998 | Moncreiff ................... 709/217 |
| 5,862,330 A | * 1/1999 | Anupam et al. ............ 709/204 |
| 5,884,032 A | 3/1999 | Bateman et al. |
| 5,907,547 A | 5/1999 | Foldare et al. |
| 6,031,836 A | 2/2000 | Haserodt |
| 6,385,191 B1 | 5/2002 | Coffman et al. |

OTHER PUBLICATIONS mIRC v.3.7 "Versions.txt" (Dec. 10, 1995)—retreived from www.mirc.org.*
Judith Donath et al. "The Sociable Web", MIT media lab, Internet: http://judith.www.media.mit.edu/SocialWeb/SociableWeb.html.*
Frentzen, Jeff "Real–time Internet conferencing takes off," PCWEEK Feb. 20, 1995 v12 n7 p. 18 (Computer Select CD, Dec. 1995).*
Constance, Paul "Interlink posts intelligence data on the Web for 100,000 curious surfers," Government Computer News, May 27, 1996 v15 n11 p. 60. (Computer Select CD, Dec. 1996).*
"Choose your topology", RELease 1.0, Jun. 23, 1995 v95 n6 p. 15. (Computer Select CD, Dec. 1995).*
"Look who's talking", Computer Letter, Jul. 29, 1996 v12 n25 p1. (Computer Select CD, Dec. 1996).*
David Blair, "MaxWeb 2.0: Interactive 3D Cinema on the World Wide Web", USENET posting Apr. 3, 1995. Internet—www.google.com/groups.*

(List continued on next page.)

Primary Examiner—Dung C. Dinh
(74) Attorney, Agent, or Firm—Blakely, Sokoloff, Taylor & Zafman LLP

(57) ABSTRACT

A real time chat server (610) not only maintains the chat session but also synchronizes the browse and chat functions by dynamically linking the browser and chat applications to allow the contents of the browser window and the chat window to change in a coordinated manner. The chat server is built from a number of core software objects, namely user objects (616, 618), connection objects, and room objects (612, 614). In this way, multiple users' browsers may be connected into one powerful distributed chat/HTTP server and all such users are able to fully interact with one another in a coordinated manner via type-written messages, HTML web documents, and file transfers.

24 Claims, 9 Drawing Sheets-

OTHER PUBLICATIONS

Welch, N., "Custom Forums let users meet on–line," *Gateways*, p. 15, Nov. 19, 1991.

Zimmerman, M.R., "OnLive software lets user converse over the Internet," *PC Week*, p. 14, Sep. 30, 1996.

"Travlang Chat," http://chat.travlang.com/., 1995–1998 travlang.

"Chat," WBS, http://wbs.net/wcc.html, WebChat Communiations, Inc., 1995–1998.

"Tennis Chat," WebChat™, Internet Roundtable Society, JJ Unlimited, http://www.tenniscountry.com/chat.html, 1995.

Streeter, A., "ELS Opens windows on chat."

Busey, A., "The Other Side of Muds," *Secrets of the Mud Wizards*, Chapter 12 p. 215–433, Sams.net Publishing, 1995.

Metz, E., "Java, Jfactory, and Network Development," *Dr. Dobb's Journal*, p. 78–87, Sep. 1996.

Miller, M.J., "Being Virtual," *PC Magazine*, p. 29, Feb. 6, 1996.

Pearlstein, J., "Serving up real–time Chat," *Gateways*, Jun. 3, 1996.

Pearlstein, J., "Tapestry Eases HTML," *Gateways*, p. 20, Jun.17, 1996.

Seminerio, M., "eShare Chats Up Intranets With Expressions Software," *PC Week*, p. 33, Feb. 24, 1997.

Serrat, E.M., "A NetWare Chat Utility," *Dr. Dobb's Journal*, p. 60, Nov. 1993.

Stanton, J., "Internet to get chattier," *Gateways*, p. 28, Aug. 7, 1995.

Thomas, R., "On–Line Conferencing and Reader Responses," *UnixWorld*, p. 111–113, Jan. 1989.

Tweney, D., "Best Online Services," *PC World*, p. 153–162, Aug. 1996.

Amdur, D., "Virtually Speaking," *Multimedia World*, p. 114, Mar. 1996.

Conatser, K., "RoundTable brings Web chat, file sharing to life," *InfoWorld*, p. 3–4, Aug. 5, 1996.

Conatser, K., "VolcanoChat is a simple way to add interactivity," *InfoWorld*, p. 12., Oct. 28, 1996.

Conatser, K., "WebBoard builds powerful on–line forums effortlessly," *InfoWorld*, p. 4–5, May 13, 1996.

Desmond, M., "The Shape of Things to Come: Alpha World Brings a 3–D Virtual World to the Internet," *Multimedia World*, p. 16–17, Sep. 1995.

Hill, J., "Tribal Voice: PowWow," *PC Magazine*, p. 118, Oct. 8, 1996.

Jones, C., "Audio goes live on Web," *InfoWorld*, p. 15–16, Sep. 23, 1996.

Kramer, M., "Neat ways to meet on the Net," *PC Week*, p. 87, Apr. 15, 1996.

Kramer, M., "Web heeds conference call," *PC Week: PC Weeklabs Reviews*, p. 59, Feb. 26, 1996.

* cited by examiner

METHOD AND APPARATUS FOR SYNCHRONIZING BROWSE AND CHAT FUNCTIONS ON A COMPUTER NETWORK

BACKGROUND OF THE INVENTION

1. Field of the Invention

The present invention relates to network communications, and more particularly to synchronized browse and chat functions on a computer network.

2. Description of Related Art

The location and exchange of data over computer networks is controlled by various network protocol. For example, the World Wide Web (hereinafter "Web") is a system of communications protocols that presents information in documents that are capable of being linked to other documents. The documents are stored in a distributed manner across the Internet on the networked computers, and are accessed using programs known as browsers.

The Web is a system of protocols exchanged between a host computer running an application, known as a server, that delivers Web documents, and a user's computer, known as the client. Web documents are created using a markup language known as HTML, or Hypertext Markup Language. Hyperlinks are used to connect a document on one host computer to a document on another host computer. The following HTML paragraph is illustrative.

<P>
Welcome to the home page of <B> ichat, Inc. </B>. We develop <A
HREF=". . . /products/index.html">software </A> that expands the
functionality and accessibility of real-time Internet chat systems.

The HTML tag "<A HREF=" instructs the browser to create a link to a web page referenced by the embedded Uniform Resource Locator ("URL"), which is a type of address, and to use the word "software" embedded between the tags ">. . . </A>" as the hyperlinked word. The link may be a target, which is a word or phrase in another section of the same Web page; a relative link, which is another Web page within the current site, either forward or backward relative to the current page; or an external or absolute link, which is a Web page on another host.

The dominant transfer protocol in use on the Web is HTTP, which stands for Hypertext Transfer Protocol. HTTP sits on top of TCP/IP and is a stateless protocol designed to transfer documents at a high rate of speed. As a stateless system, HTTP does not retain any information from one document transfer to the next. If additional documents are needed, each additional document must be transferred by opening a new HTTP connection, requesting the document, delivering the document, and closing the connection.

Although generally successful for many Web functions, the HTTP protocol is ineffective for enabling real-time functions such as chat over networks such as the Internet. However, chat is available over the Internet using the Internet Relay Chat protocol, or IRC. IRC uses the TCP/IP protocol in a client/server model. One IRC client initiates a channel by connecting to an IRC enabled server, which may or may not be on the same host as the Web server. Other clients join the channel by typing a join IRC command. The IRC server mediates the channel, passing each message to all channel members or to particular channel members, as determined by the originator of the message.

As initially implemented, IRC was of limited usefulness to users who wished to coordinate their chats with Web browsing. Some techniques have emerged for facilitating coordination of chats with browsing. In a technique generally known as integrated HTML chat, chat is incorporated into the HTML frame. The user receives an HTML page with an embedded chat window, types his or her reply to a message in the chat window, and sends the revised page back to the originating server. In another technique, a separate chat application such as IRC runs as a plug-in to the user's browser and displays a chat window either on the side of or embedded into the browser window. In these examples, the chat and browser applications run independently of one another, relying on user interaction at particular points in time to achieve browse-chat coordination. Unfortunately, independence of operation causes the browser and chat applications to be generally uncoordinated, and the need for the user to coordinate their operation is inconvenient.

SUMMARY OF THE INVENTION

The present invention advantageously synchronizes real-time chat for the Internet/intranet with HTML Web browsers, and is applicable to on-line user groups, technical support, product marketing, entertainment and the creation of dynamic multimedia content. Web site administrators are able to combine product and service information on a site with the added benefit of Web tours, live forums and sales and technical support. Tour guides, human or automated, are able to educate and direct visitors to areas of value within a site, while continuing to chat. The guide may also leave the site and lead users to other sites of interest on the Web. Users are able to send and receive URLs as part of a regular conversation, and as in a browser the URLs are formatted as hyperlinks.

These and other advantages are variously achieved in the embodiments of the invention. For example, one embodiment of the invention is a method for synchronizing browse and chat functions on a computer network. The method comprises endowing a user with a first chat property and a first browser property, endowing the user with a second chat property in lieu of the first chat property, and endowing the user with a second browser property in lieu of the first browser property in response to the second chat property endowing step.

BRIEF DESCRIPTION OF THE DRAWINGS

In the drawings, in which like reference characters indicate like parts.

DETAILED DESCRIPTION OF THE PREFERRED EMBODIMENT

Figure 1:
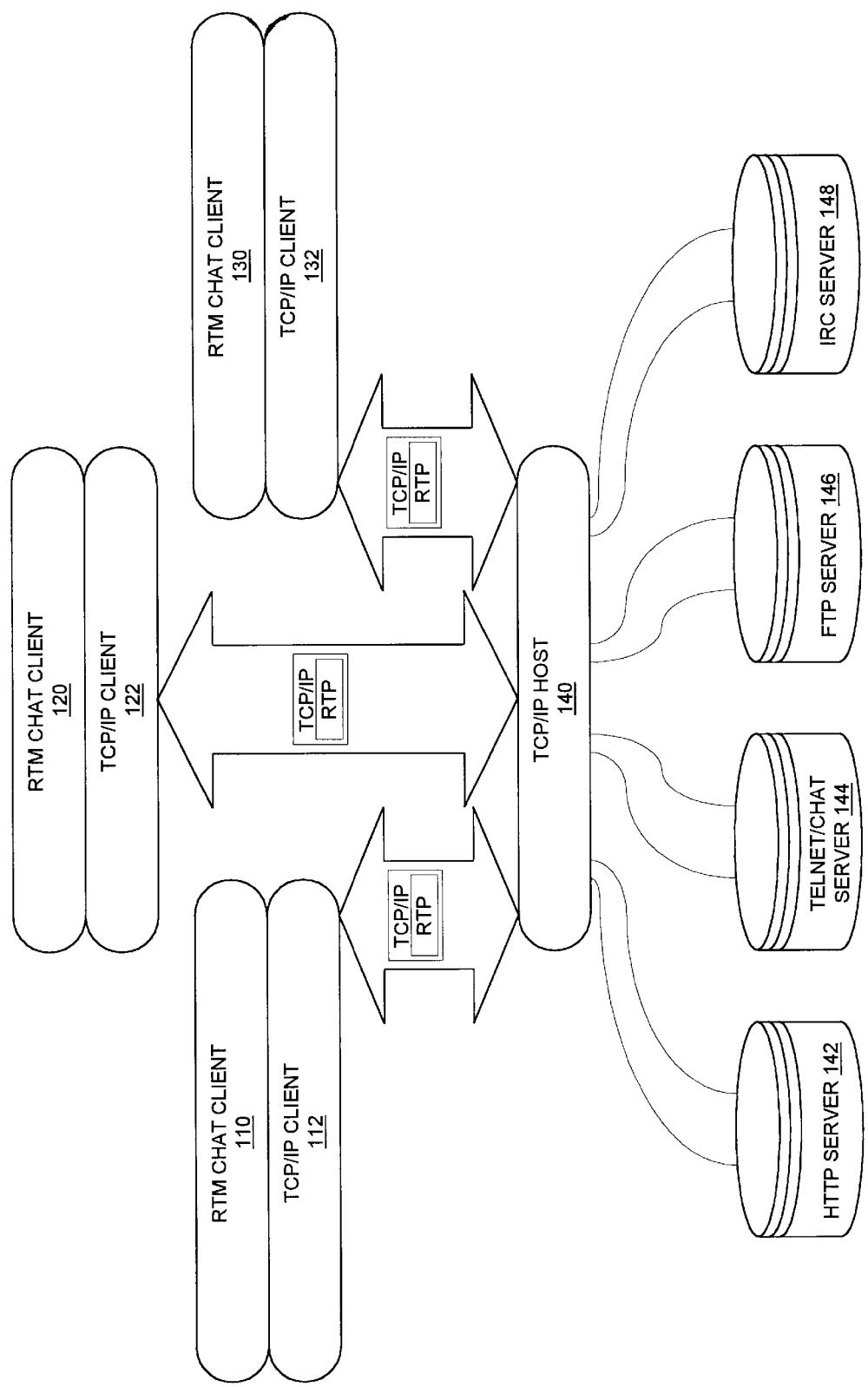
FIG. 1 is a schematic diagram of network protocol connections between clients and a host in accordance with the present invention.
Figure 2:
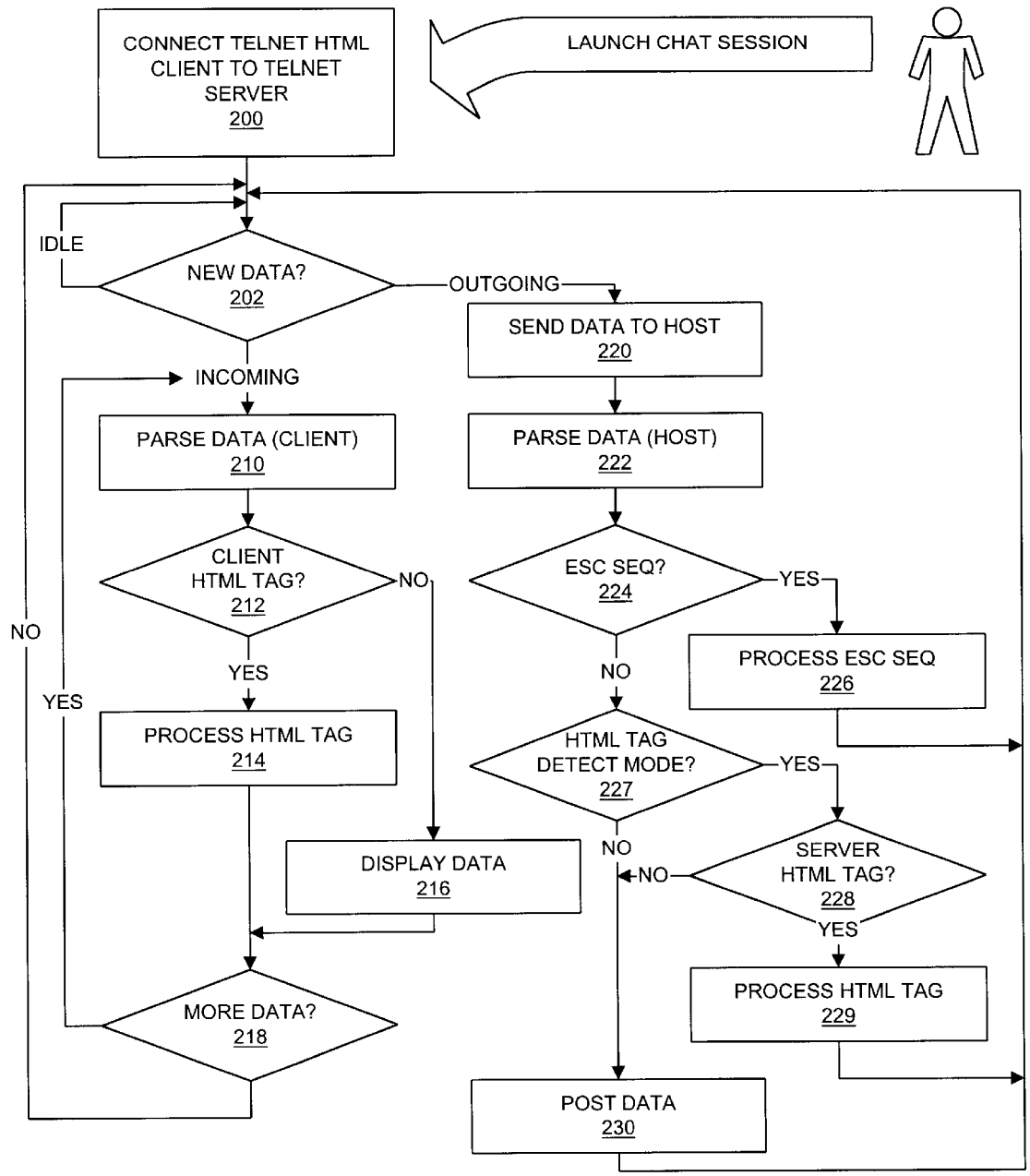
FIG. 2 is a flow chart of a method for real time network chat in accordance with the present invention.

FIG. 1 and FIG. 2 show a process for real-time conferencing across the Internet. The process begins with a user who launches a chat session from his or her computer, preferably from a browser application running on the computer, by running an application called a real time markup ("RTM") chat client. The computer operating system ("OS") causes a two-way TCP/IP connection to be established between the client computer and a host computer for the chat session, while the RTM chat client causes a real time protocol ("RTP") connection, typically full duplex, to be established between the RTM chat client and a real time server on the host. Other users join the chat session by establishing TCP/IP connections and launching their own RTM chat clients. FIG. 1 shows three RTM chat clients 110, 120 and 130, which run on top of respective TCP/IP clients 112, 122 and 132. The TCP/IP connections are established with a host computer, which runs TCP/IP host software 140 and typically hosts several different types of servers. FIG. 1 illustratively shows four servers, an HTTP server 142, a telnet/chat server 144, an FTP server 146, and an Internet Relay Chat ("IRC") server 148. Typically, a variety of other server types reside on the host computer as well, including, for example, Gopher, Usenet and WAIS.

A real time chat client is any client capable of sustaining what appears to a user to be real time chat. The effect of real time is created by using as the RTP a continuously open connection protocol such as, for example, a continuously open streaming protocol such as telnet or a continuously open connection packet protocol such as IRC. Telnet is a well known streaming protocol used to establish bi-directional continuously opened sockets and full duplex data transmission to achieve real time communications. The telnet protocol is an industry standard. UNIX hosts are generally provided with telnet servers as part of their operating systems. Other examples of continuously opened connection streaming protocols include UDP, or Universal Data Protocol, and a variety of proprietary protocols. IRC is a well known packet protocol used to establish bi-directional continuously opened sockets and full duplex data transmission to achieve real time communications. The IRC protocol is an industry standard, fully defined in RFC 1459. In contrast, the HTTP protocol defines a transactional half-duplex data transmission. HTTP connections are opened and closed as documents are requested and sent. Real time communication is not realized.

A markup language is any language that enables document formats to be defined, and may also enable hyperlinks to be embedded in documents. The most popular markup language in use on the Web is HTML, which supports embedded hyperlinks, various font styles such as bold and italics, and various MIME (Multipurpose Internet Mail Extension) file types for text and embedded graphics, video and audio.

FIG. 2 shows what happens when a RTM chat client is launched. Illustratively, the chat client in FIG. 2 is a telnet HTML chat client and the host includes a telnet server and a server-side application known as a chat server that enables communication between two or more chat clients. While FIG. 2 shows use of the telnet protocol and a compatible chat server, the IRC protocol and an IRC chat server may be used if desired, as well as any other continuously open bi-directional connection chat client—server types and compatible chat server applications. Chat servers are well known; for example, the telnet protocol and proprietary chat server software is commonly used by commercial BBS services, and the IRC protocol and IRC server side chat applications are common in many UNIX environments. While FIG. 2 also shows use of HTML, other markup languages may be used if desired.

After the TCP/IP and telnet connections are made (step 200), the telnet HTML chat client immediately begins to receive any messages being posted by the chat server, and may send messages to other telnet HTML chat clients through the chat server or remain idle in the event that no messages are being sent or received. While non-HTML telnet clients may also be connected to the chat server, they will not be capable of displaying the incoming data with fidelity because they will not be able to properly parse it.

Messages outgoing from the telnet chat client are processed as follows. The telnet chat client is designed either to send each keystroke to the host either individually or in groups. In either case, the telnet chat client appends the keystroke(s) to a TCP/IP header and the resulting packet is sent to the chat host (step 220). The chat host parses the incoming data in real time (step 222). If the chat host detects a telnet escape sequence (step 224), it processes the detected escape sequence (step 226). If the chat host is set to a mode for processing HTML tags (step 227) and detects a server-executable HTML tag (step 228), it processes the detected HTML tab as appropriate (step 229). If the chat host does not detect a telnet escape sequence and either is not in an HTML tag detect mode or does not detect a server HTML tag if in an HTML tag detect mode, the chat host simply posts the data (step 230) to all connected telnet clients or to a specific or ones of connected telnet clients if so instructed by the chat server. Connected telnet clients that are not HTML enabled simply display any HTML tags as they are received. However, connected telnet HTML clients recognize and respond to the HTML tags in the data.

Messages outgoing from an IRC chat client are processed in a slightly different manner. An IRC packet is the entire series of keystrokes preceding a carriage return. An IRC chat client appends the IRC packet or in some cases breaks up the IRC packet into sub-packets and appends each sub-packet to a TCP/IP header, and the resulting TCP/IP packet is sent to the IRC chat host. The IRC chat host parses the incoming data in real time, processing any IRC headers and handling the appended data accordingly.

The telnet chat client processes incoming messages containing HTML tags as follows. The telnet chat client parses the incoming data (step 210) to distinguish between HTML tags and characters to be displayed. If a client-executable HTML tag is detected (step 212), the tag is processed as appropriate (step 214). If a client HTML tag is not detected (step 212), the incoming data is displayed on the chat screen of the telnet chat client computer (step 216). In either case, the telnet chat client then looks for more data to process (step 218), and either resumes parsing or idles if no incoming or outgoing message is present.

The telnet connection is terminated either by the client or the host. Termination is done by releasing the socket for the connection, in a manner well known in the art.

An example of a real time chat session among chat clients using HTML is as follows.

<Sarah> Hi everyone! I found a great web site. Check out the ichat site.

<Sam> Thanks for the info, Sara. I'm going to check out the site now. Bye.

This text appears on the screens of the HTML chat clients who are members of the chat session.

When Sarah types her message, she uses either macros or HTML itself to cause the word "great" to appear in an italics font style, the phrase "Check out" to appear in a bold font style, and to create the hyperlink ichat site. Sarah's chat client software sends the is following illustrative data stream to members of the chat session via the host.

Hi everyone! I found a <I> great </I> web site. <B>Check out </B> the <A
   HREF="http://www.ichat.com"> ichat site. </A>

The HTML chat client software displays Sara's message as it is typed in a normal font, until the "<I>" tag is detected (the sharp brackets connote an HTML control). The characters "great" are displayed as they are typed in an italics style font until the "</I>" tag is detected, after which subsequent characters are again displayed at they are typed in a normal font. When the "<B>" tag is detected, the subsequent characters "great" are displayed as they are typed in a bold font until the "</B>" tag is detected, after which subsequent characters are again displayed at they are typed in a normal font. When the tag "<A HREF="http://www.ichat.com">" is detected, Sam's software responds by linking the URL "http://www.ichat.com" to the text following the tag, until the tag "</A>" is detected. Hence, the URL "http://www.ichat.com" is linked to the hyperlink ichat site. This hyperlink is displayed as its characters are typed in a underlined and colored font until the "</A>" tag is detected, after which any subsequent characters are displayed at they are typed in a normal font.

Sam responds to Sara's message with his message, and then simply clicks on the hyperlink "ichat site" in his chat window using either his mouse or keyboard navigation. This action launches Sam's Web browser, if it is not already running. Sam's Web browser takes him to the ichat home page, without need for Sam to enter a URL.

Figure 3:
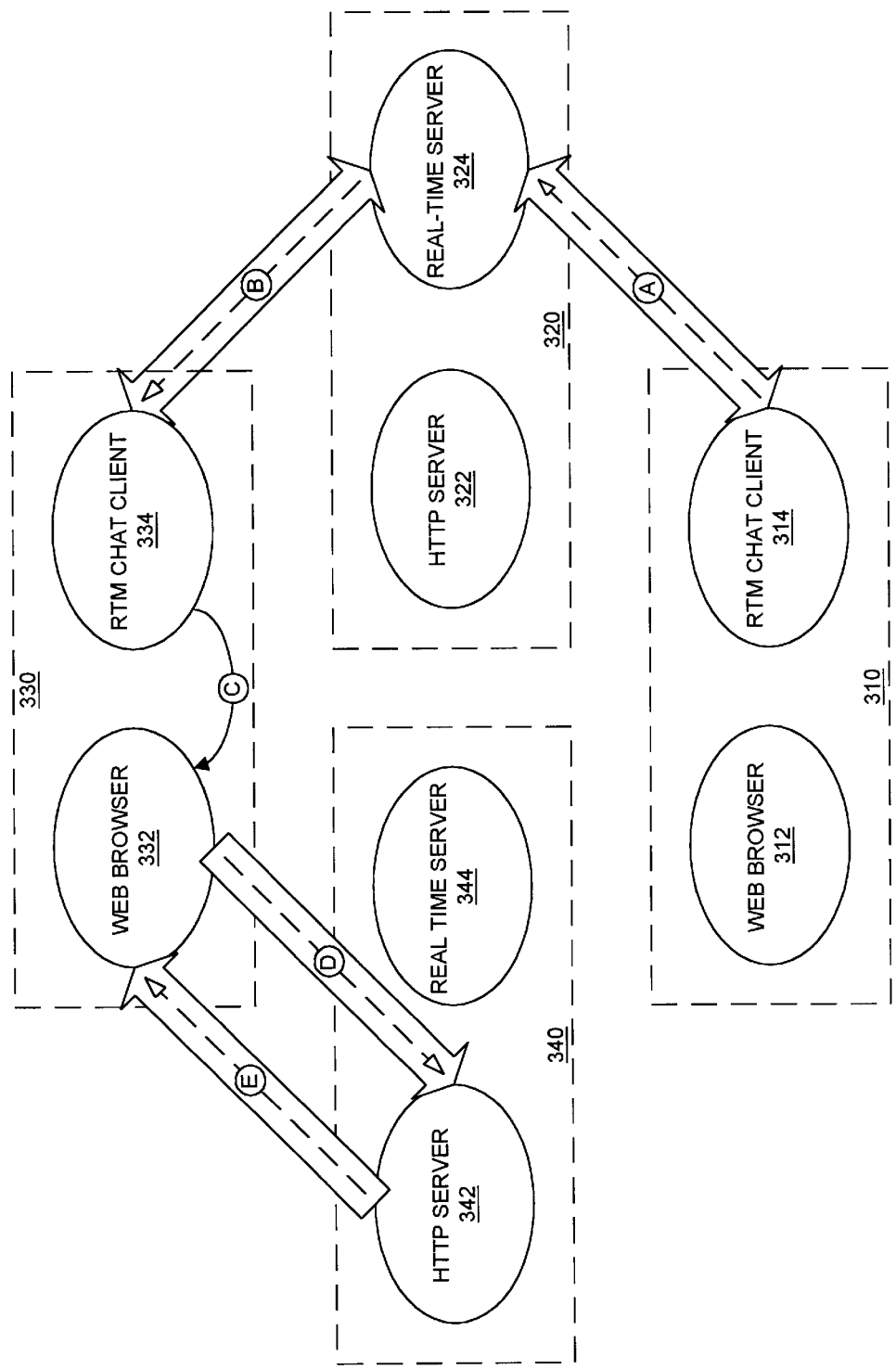
FIG. 3 is a schematic diagram of how a hyperlink functions during a real time network chat, in accordance with the present invention.

The manner in which hyperlinks function in a chat session among RTM chat clients is shown in more detail in FIG. 3. The two way arrow between RTM chat client 314 in client 310 and a real time server 324 in host 320 represents a bi-directional TCP/IP—real time protocol communications channel. The two way arrow between RTM chat client 334 in 15 client 330 and the real time server 324 in host 320 also represents another bi-directional TCP/IP—real time protocol communications channel. The one way arrows between web browser 332 in the client 330 and HTTP server 342 in host 340 represent respective one way TCP/IP HTTP (transactional) protocol communications channels. The host 310 need not include a Web browser, the host 320 need not include an HTTP server 322, and the host 340 need not include a real time server 340.

RTM chat client 314 (e.g. Sarah) creates a message that includes an embedded hyperlink, and sends that message through the real time server 324 (action "A") to the RTM chat client 334 (e.g. Sam) (action "B"). Under some circumstances the real time server 324 acts on the embedded hyperlink, although in the example of FIG. 3 the real time server 324 merely posts the message to the RTM chat client 334. Note that other actions that may be occurring, such as echo of the message back to the RTM chat client 314 and communication of the message to other joined chat clients, are omitted for clarity. The client 330 (e.g Sam) then causes his Web browser 332 to access the URL associated with the hyperlink embedded in the chat message (e.g. ichat site) (action "C"). Action "C" is performed in any suitable manner. For example, if the Web browser 332 is inactive, the RTM chat client 334 simply launches the Web browser 332 using the URL associated with the hyperlink as a command line argument. If the Web browser 332 happens to be running, the RTM chat client 334 communicates the page request to the Web browser 332 using any suitable interface protocol such as the DDE protocol, which is standard in such operating systems as the Microsoft® Windows® Version 3.1 operating system and the Microsoft® Windows® 95 operating system. Newer protocols and methods suitable for having the RTM chat client 334 cause the Web browser 332 to acquire a Web page include plug-in technologies, ActiveX technologies, and Java technologies. The Web browser 332 makes a TCP/IP connection with the HTIP server 342 (or any other HTTP server, including HTTP server 322) and Web browser 332 makes a request for a Web page (action "D") by sending the URL associated with the embedded hyperlink. The HTTP server 342 responds by delivering the requested Web page (action "E"), and the TCP/IP connection between the Web Browser 332 and the HTTP server 342 is terminated. Meanwhile, the bi-directional TCP/IP—real time protocol communications channels between the RTM chat client 314 and the real time server 324, and between the RTM chat client 334 and the real time server 324 remain open if desired to continue the chat session.

Figure 6:
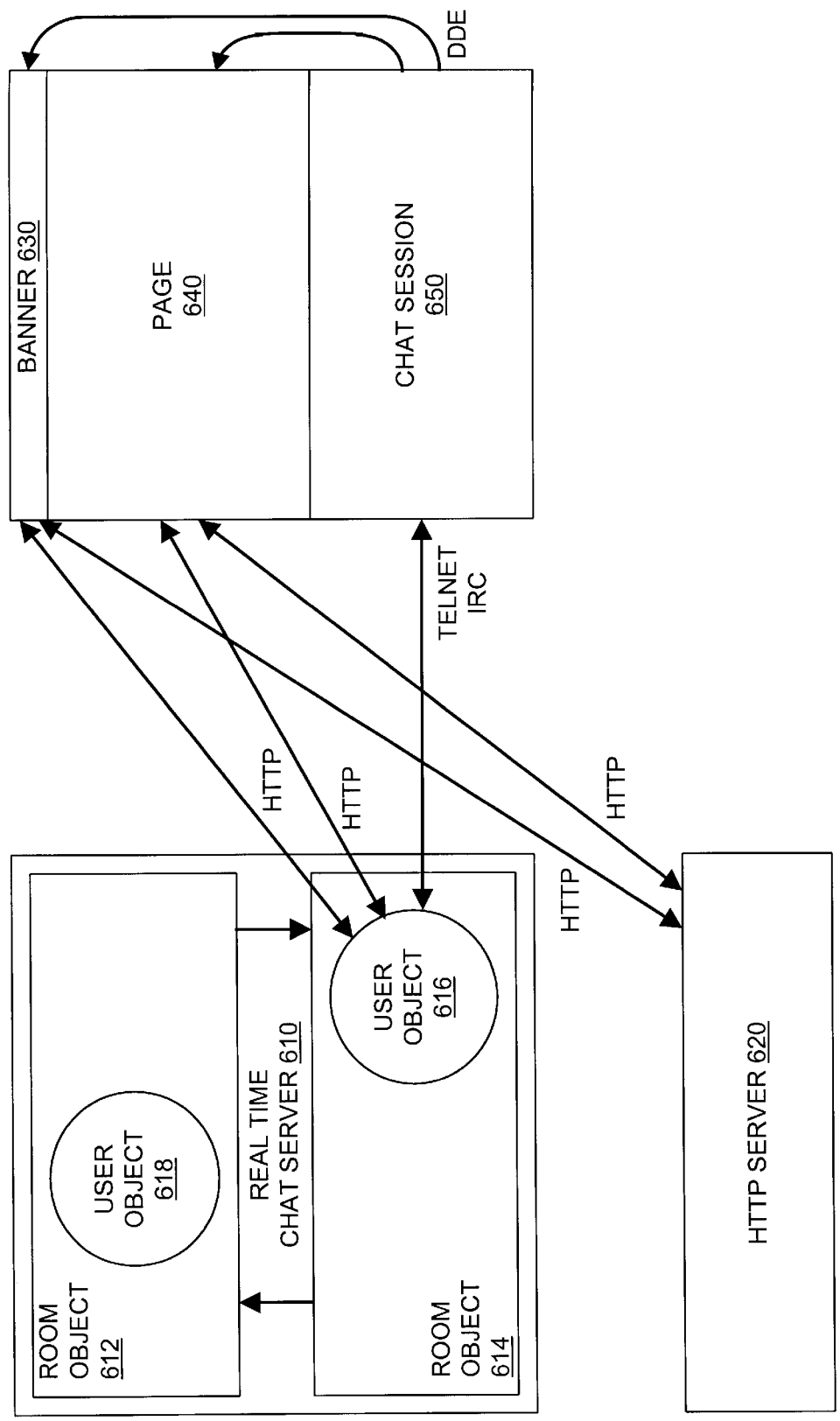
FIG. 6 is a block schematic diagram showing a state of a two room world and the relationships between a chat server, a Web server, and elements of the user's display.

FIG. 6 shows a real time chat server 610, which not only maintains the chat session as does the real time server 324 of FIG. 3, but also synchronizes the browse and chat functions by dynamically linking the browser and chat applications to allow the contents of the browser window and the chat window to change in a coordinated manner. In this way, multiple users' browsers maybe connected into one powerful distributed chat/HTTP server and all such users are able to fully interact with one another in a coordinated manner via type-written messages, HTML web documents, and file transfers.

A useful metaphor for synchronized chat and browse functions is that of a visitor able to move from room to room of a building, each room containing remarkable things and a group of people engaged in a spirited discussion about the things in their room. The visitor may remain in the present room and continue the present discussion while looking at the remarkable things on display in the present room, or may peak into a different room and continue the present discussion while looking at the remarkable things on display in the different room, or may move to a different room and join the discussion in progress in that different room, or may follow another visitor to a different room and join with the other visitor in the discussion in progress in that different room. In practice, the real time chat server 610 synchronizes the browse and chat functions when the user, or visitor of the metaphor, moves into another room, so that not only does the browser content change but the chat also changes in a coordinated manner.

Consider the following example of communications on the Web, which shows the usefulness of a dynamic link between the browse and chat functions. A user loads a first chat-enabled Web page and wishes to join a chat associated with the first Web page. The user merely clicks on a chat button to display a chat associated with the first Web page. Preferably the chat window is embedded in the Web browser window, although the two windows may be separate if desired or the browser window may be embedded in the chat window.

If the user learns of a second Web page of interest from another chat member during the chat, the user need only click on the hyperlink provided in the chat window to examine the second Web page while continuing to participate in the chat associated with the first Web page. If the second Web page is chat-enabled and the user wishes to join a chat associated with the second Web page, the user need only click on the chat button in the second Web page. Lets say that this new site has a "speaker" who presents a variety of "slides," which are different Web pages on the speaker's site or on other sites or are sections of the current Web page, and discusses each slide with users in the chat group. A user might ask a question about one of the slides, to which the speaker is able to respond by simply answering the user's question in the chat window, or by showing other slides to the user individually or with the audience and discussing the other slides in the chat window, or by taking the user individually or with the audience to a different Web page on or off the current site either to continue the chat by discussing the new Web page or to join the chat associated with the new Web page, or by suggesting that the user go to a different Web page to join a chat associated with the new Web site.

A sequence of events illustrating some of these capabilities is shown in FIG. 4. FIG. 4A shows the screen of a user Ursula who wishes to join a chat in progress on the subject of where to go to fix computers. The user launches her Web browser and brings up an HTML page 410 in her browser window having a schedule of computer chats. Illustratively, one of the scheduled chats is on sharing ideas about where to go to fix computers is in progress. To join in that chat, the user clicks the hyperlink "CHAT" (411).

Figure 4A:
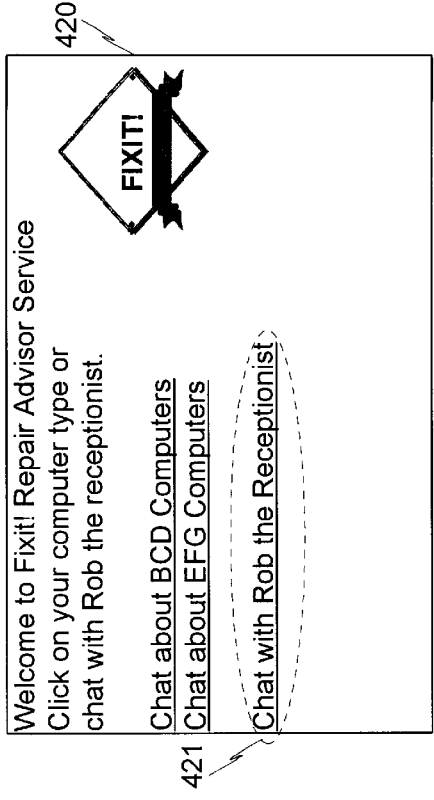
FIGS. 4A, 4B, 4C, 4D, 4E, 4F, 4G, 4H, 4I and 4J are pictorial representations of user displays, in accordance with the present invention.
Figure 4C:
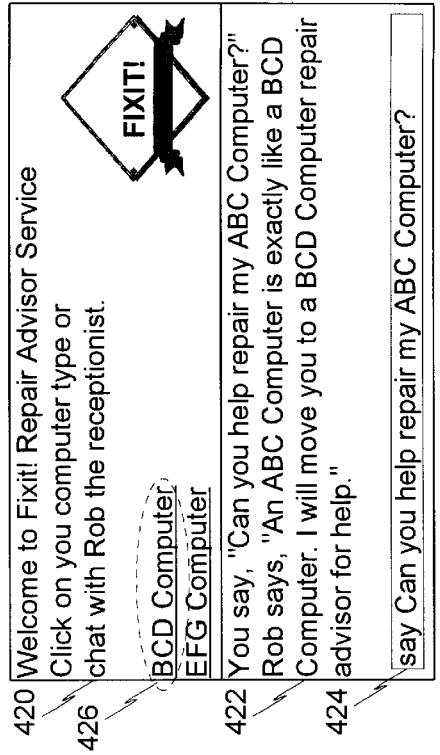
Figure 4B:
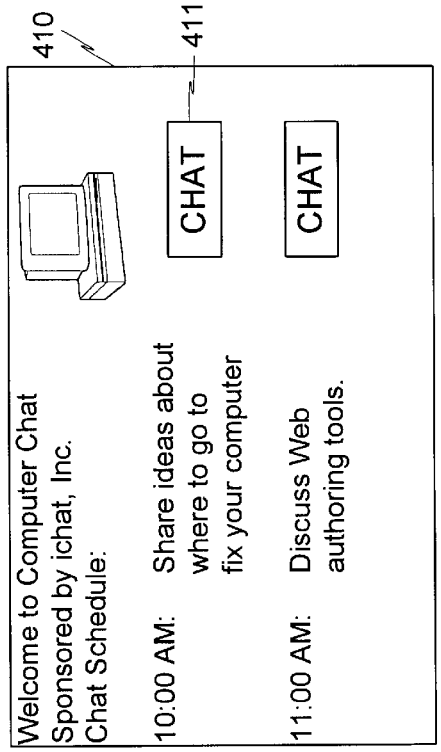

FIG. 4B shows the result of the user's having clicked on "CHAT" (411). A chat window opens containing the selected chat session 412. The chat window containing the chat session 412 is embedded in the browser window displaying the page 410. The user announces to the chat group by typing (not shown) into a message entry area 414 that she needs advice on fixing her computer, and one of the chat participants, Able, responds in the chat session 412 by recommending the Fixit! repair advisor service. Able also creates the hyperlink "Fixit! for the user and the chat group generally. Ursula thanks Able and clicks on the hyperlink "Fixit!" (action 416) in the chat session 412.

FIG. 4C shows the result of the user's having clicked on "Fixit!" (action 416). A Fixit! welcome page 420 displays which contains a list of computer brands, and the user is able either to enter into a chat about any of the computer brands by clicking on the hyperlink for that computer brand on the page 420, or to request help from the receptionist Rob by clicking on the hpyerlink "Chat with Rob the Receptionist" on the page 420.

Figure 4D:
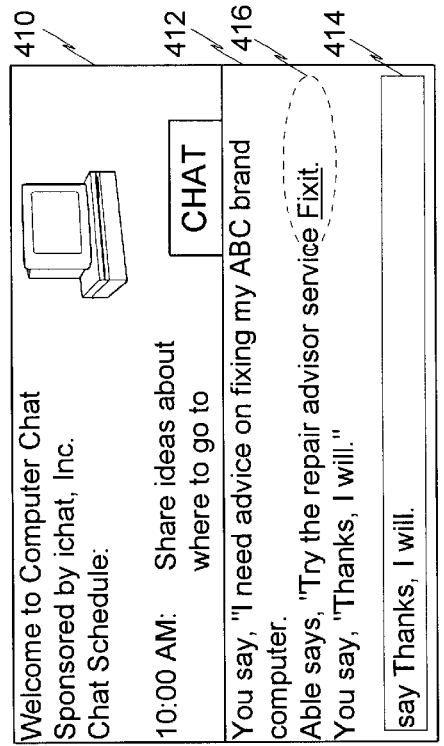

FIG. 4D shows the result of the user's having clicked on "Chat with Rob the Receptionist" (action 412). A chat window appears showing a synchronized chat session 422. The chat window containing chat session 422 is embedded in the browser window containing the HTML page 420. The chat window containing chat session 422 also contains a message entry area 424. Since Ursula's computer type is not listed, she joins the chat session in progress by using the message entry area 424 (FIG. 4C) to ask the receptionist if Fixit! can help repair her computer. The receptionist Rob replies in the chat session 422 that the user's ABC brand computer is the same as a BCD brand computer, and offers to move her to a BCD computer repair advisor for help.

Figure 4E:
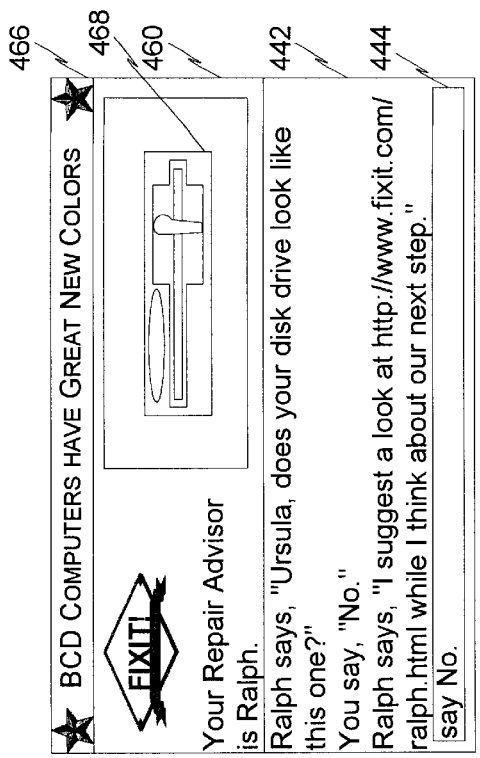

FIG. 4E shows a Fixit! repair advisor welcome page 440 appearing in the browser window along with a synchronized chat session 442 in the embedded chat window, which result from Rob's having moved Ursula to BCD Computer repair advisor Ralph. Illustratively, pages 420 and 440 are on the same site, viz. the Fixit! site. The chat window containing the chat session 442 also contains a message entry area 444. An advertising banner 446 appears in a banner window above and adjacent to the browser window containing page 440. The general type of banner is synchronized with the chat, here BCD Computer Inc. advertisements where the chat is about fixing BCD brand computers, and the specific message of the banner changes either periodically or in some other suitable manner, as by context sensitivity. The repair advisor Ralph greets Ursula, Ursula describes the problem, and Ralph suggests a look at a particular HTML page to help identify exactly the failed component in Ursula's computer.

Figure 4F:
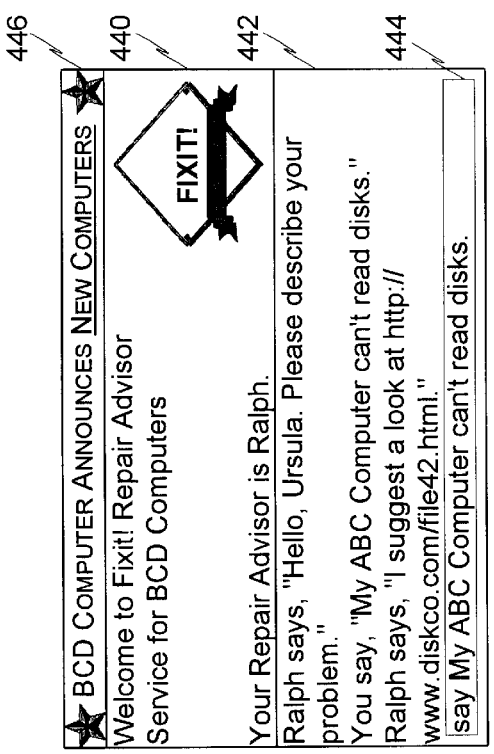

FIG. 4F shows in the browser window an image 458 of one type of disk drive that might have been installed in Ursula's ABC Computer. The image 458 is part of HTML page 450. Page 450 is not from the Fixit! site. Rather, page 450 is from the site http://www.diskco.com, although it could have been a page from a different server on the Fixit! site, a page from the same server as page 440, or even a different section of the page 440. Page 450 appears with and is synchronized with chat session 442 in the embedded chat window. A new synchronized banner 456 appears in the banner window. As it so happens, the component shown in the image 458 is not the type in Ursula's computer. Ralph suggests a look at another HTML page to help identify exactly the failed component in Ursula's computer.

Figure 4G:
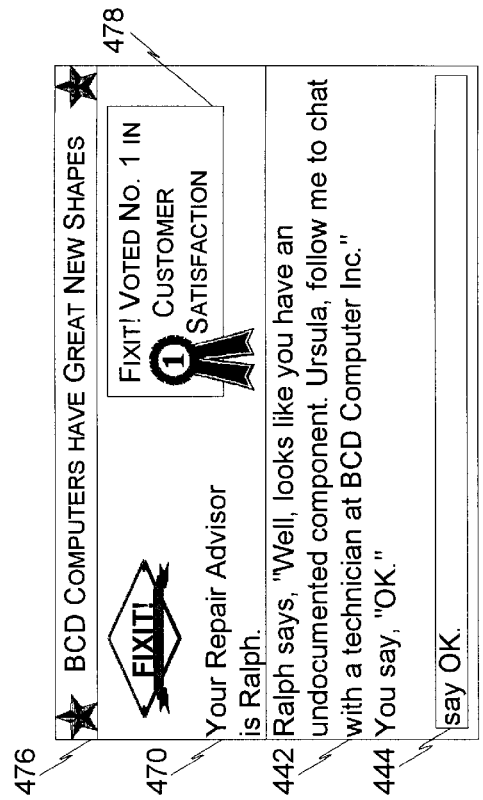

FIG. 4G shows in the browser window an image 468 of another type of disk drive that might have been installed in Ursula's ABC Computer. The image 468 is part of HTML page 460, which also is from the server http://www.diskco.com, although it could have been a page from a different site or server. Page 460 appears with and is synchronized with chat session 442 in the embedded chat window. A new synchronized banner 466 appears in the banner window. As it so happens, the component shown in the image 468 is not the type in Ursula's computer. Ralph suggests a look at a Fixit! promotional page while he decides on a course of action.

Figure 4H:
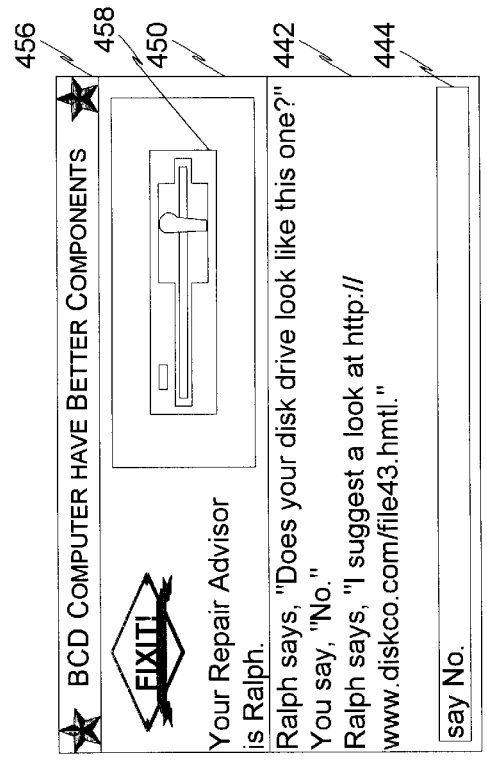

FIG. 4H shows in the browser window an image 478, which is a promotional graphic. The promotional graphic 478 is part of HTML page 470, which is Ralph's page on the Fixit! site. The new page 470 and the old chat window 442 are synchronized. Another new synchronized banner 476 appears in the banner window. Unfortunately, none of the components shown in graphics 458 and 468 is in Ursula's computer, and Ralph announces his conclusion in chat session 442 (FIG. 4H) that Ursula has an undocumented component in her computer. Ralph decides that the best course of action is for Ursula to follow him to chat with a BCD Computer technician to discuss the problem, and makes a suggestion to this effect.

Figure 4J:
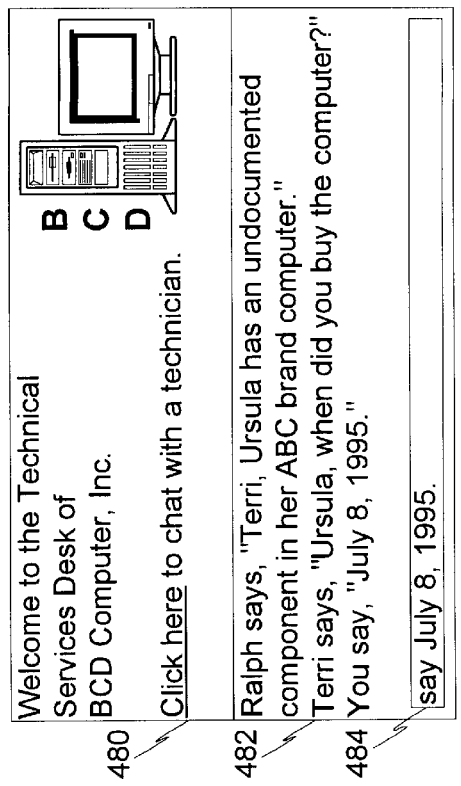
Figure 4I:
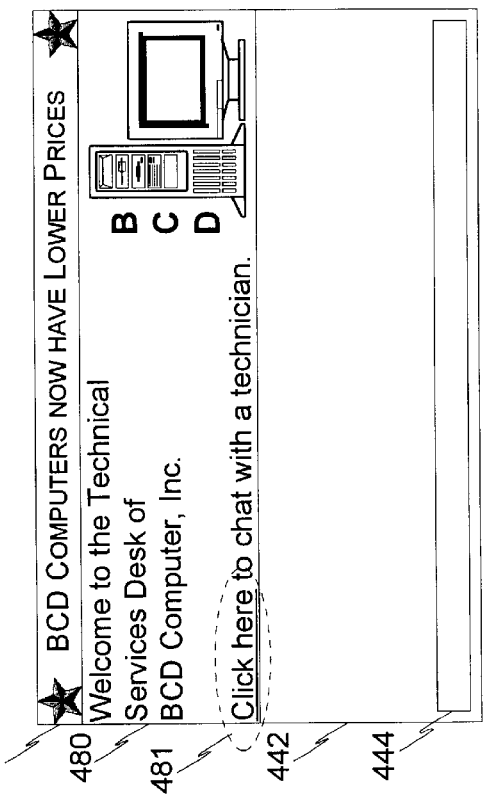

FIG. 4I shows a BCD Computer technical services desk welcome page 480 in the browser window. HTML page 480, which illustratively is on the BCD Computer Web site and not on the Fixit! Web site, is selected by Ralph so that he can discuss Ursula's problem with a BCD Computer technical expert. Page 480 appears with and is synchronized with chat session 442 in the embedded chat window, which contains the message entry area 444. A new synchronized banner 486 appears in the banner window. Since Ralph wants to chat with a BCD Computer technician, he clicks on "Click here" (action 481) on the page 480.

FIG. 4J shows the BCD Computer technical services desk welcome page 480 in the browser window. However, since Ralph clicked on the chat hyperlink on page 480 and since Ursula is following Ralph, the new page 480 becomes synchronized with a new chat session 482 in the chat window, which contains the message entry area 484. Illustratively, no banner is associated with either the new page 480 or the new chat session 482, so no banner window appears. Ursula is likely to have her problem resolved now that experts from Fixit! and BCD Computer are both involved in a chat with her about her problem.

Table 1 below summarizes the capabilities showcased in the foregoing example, which constitute a useful set of capabilities for chat-enabled Web servers and clients.

TABLE 1

| OBJECTIVE | ACTION | APPEARANCE OF BROWSER AND CHAT WINDOWS |
|---|---|---|
| View a new page (different site, same site, or same server) | Select a bookmark, or enter the URL of the new page, or click on a hyperlink in the browser or chat windows. | Desired page displays in the browser window while the current chat session continues in the chat window. If the new page is chat enabled, a hyperlink is shown which enables a new chat session synchronized with the new page to be displayed. |
| Join a new chat session | Navigate to an adjoining "room" using a direction command, or by clicking on a hyperlink in the chat window, or by using a teleportation command, or by using a goto command to join a specified target. | New chat session displays in the chat window, and a synchronized page displays in the browser window. |
|  | View a new chat-enabled page, then click on the chat hyperlink. | Desired page displays in the browser window, then after the click a new chat session synchronized with the new page displays in the chat window. |
| Follow another user | Invoker enters the "follow" command followed by the name of the user (the target) the invoker wishes to follow. | The invoker's browser and chat windows are the same as that of the target until either the invoker or the target enters a "stop following" command. |
| Post an HTML page in another user's browser window | Invoker enters the "suggest" command followed by the name of the target and the URL of the HTML page. | The target's chat window remains the same as the invoker's chat window but the target's browser window contains the page specified by the invoker. |
| Move a target to another chat session and post its associated HTML page to the target's browser window. | Invoker enters the "move" command followed by the name of the target and the path of the new chat room. | New chat session displays in the chat window, and a synchronized page displays in the browser window. |

Various implementations of a chat server to synchronize the chat and browse functions are possible and include a variety of command sets as well as linear and object oriented programming techniques. Preferably, the chat server is implemented using object oriented techniques. Users are realized as instantiations of a user object. The user object "resides" in an instantiation of a room (like one of the rooms of the metaphor), which is characterized by a particular browser connection (like the remarkable things of the metaphor) and a particular chat connection (like the discussion group of the metaphor). The user object is fully aware of these browser and chat connections of the room in which it is resident. Like the visitor of the metaphor, the user object is able to move or be moved to another instantiation of a room, which is also characterized by a particular browser connection and a particular chat connection, and becomes fully aware of the new browser and chat connections that characterize the new room. Physically, the user's browser and chat connections change immediately as the user object become aware of the browser and chat connections of the new room.

The room is an element of a world, which is a collection of rooms. The rooms within a particular world define areas of special interest and preferably are arranged in a manner where a user can move easily from one room to another. For example, if the designer of a world is working on a Web site that will showcase five products of a common manufacturer, the world is in one implementation a six room world, one room being a main entry area and the other five being product rooms. In this implementation, each room contains an HTML page illustrating features of a particular product and a chat area where customers and salesmen discuss the product. When designing a world, take into account how many rooms are needed for the world, what URLs (HTML pages) will be associated with each room, and how the rooms are connected (user traffic flow).

Figure 5:
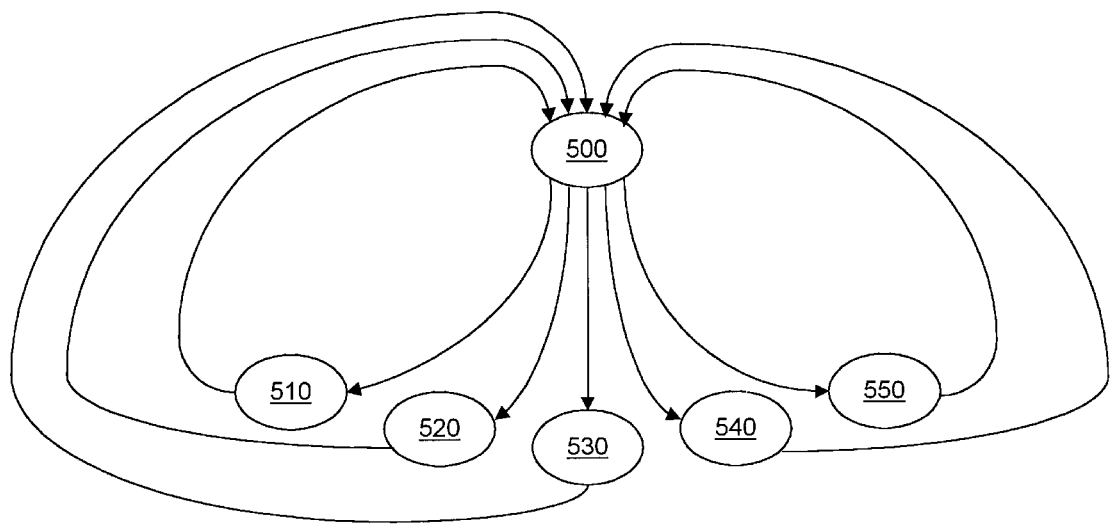
FIG. 5 is a schematic diagram of a world topography.

User traffic flow is taken into account when designing a world. User traffic flow is defined by room exits that connect one room to another. For example, the product promotional site mentioned above in one implementation has the six room topology shown in FIG. 5, with an entry room 500 having five exits to respectively the five product rooms 510, 520, 530, 540 and 550, and with each of the product rooms having one exit back to the entry room.

Illustratively, a language called LPC is suitable for implementing the chat server, although other languages are suitable as well. LPC is an object-oriented interpreted language that is widely used in multi-user network applications, typically Multi-User Dungeons (MUDs). The chat server is built from a number of core software objects within the LPC framework. These core objects are user objects, connection objects, and room objects.

User objects are used by the chat server to identify the users of the server and to distinguish the individual user preferences on that server. Each of the users of the chat server identifies himself or herself, if desired, by means of name, gender, address, e-mail address, URL, an avatar, and a description. These attributes are stored in the user object and can be queried and viewed by other users of the chat server. The user object also has associated with it the method by which the user connected to the server. The connection method is obtained through the connection objects that the user objects can inherit.

Connection objects give the chat server the capability to provide network connections to a variety of standard network protocols. These protocols include Telnet, HTML, IRC, and raw TCP/IP socket level communication. A user of the chat server can take advantage of one or more of these connection objects to connect and communicate to the chat server and the other user objects.

Room objects gives the chat server the capability to divide the server into different communication areas. The room objects contain the different user objects as different users login to the chat server. Each room object has attributes that are presented to the user objects contained within the room object. These attributes include a URL frame, a rotating URL frame, a short description, a long description, and a real-time chat text area.

When a user logs on to the chat server, the user is assigned a user object and the preferences of that user are restored from a database. The user object is then moved into a room object which is either the last room that user visited or the default start room for that chat server. The user is then presented with the attributes of the room object along with the names of the other user objects within that room object. All of the user objects within the room objects see the same attributes and are given the capability to communicate with the other user objects within the room object.

The chat server is configurable to give the user ways to navigate between the different rooms on the server. Each room object can be configured with exits to other room objects. In this way, the chat server creates a topology of rooms that the user can navigate. The chat server can also be configured in a flat topology such that all room objects are immediately accessible to the user. All of the objects contains within the chat server have actions that are available to the user object to facilitate communication with other user objects. These actions include different methods of text communication to one or more users, viewing URLs between one or more users, and transferring files between users.

Spatial definition within the object oriented implementation calls for movement commands to navigate within the defined environment. A suitable set includes four categories of movement commands based on function: directional movement, teleportation, following, and mobile privacy.

Directional movement is based on utilizing room exits to physically move one's avatar through the defined virtual space. The go command takes as an argument the direction in which the invoking user wishes to travel. Room exits become go commands when defined within the virtual space, in which case the user need only type the exit's name instead of preceding the name with the go command. Exit listings show up as hyperlinks which Web users need only point to and click to navigate, allowing even greater ease of movement.

The teleportation command is based on a user's jumping from one room to another in a fashion that omits the need to traverse intervening virtual space. The user's avatar simply leaves one room and enters another, whether or not connected. While teleportation is faster than directional movement, directional movement offers greater opportunities to meet new people and assist with more problems.

The goto command is a variation of the teleportation command. The goto command takes as an argument the name of a user to whom the invoker wishes to travel. Upon invocation, a request is sent to the target of the goto command to verify that it is acceptable for the teleporter to go to the target.

The follow command is based on users following other users from point-to-point within the virtual space. Since the followed user's avatar leaves one room and enters another by means of directional movement or teleportation, any following users move to the same destination using the same mode of travel. Followed Web users who encounter and utilize a hyperlink to an offsite destination are followed to that site by any followers who also have browser capabilities. Those without browser capabilities, i.e. telnet users, are simply left behind. Link following only works for the first offsite hyperlink encountered. The follow command takes one argument, which is the name of a user the invoker wishes to follow. Upon invocation, a request is sent to the target of the follow command to verify that it is acceptable for the follower to follow the target.

Mobile privacy commands with regard to movement are based on one user granting or denyuing permission to others to follow or go to him or her. Five commands provide the means by which all users may insulate themselves from would-be hangers-on: autofollow, stopfollow, autogoto, allow, and disallow. The autofollow command is directly tied to the follow command. The autofollow command allows a user to set an automatic response to requests by other users to follow them, and takes a single argument selected from the following: ask, yes, and no. When the argument is "ask," any attempts to follow that user result in a notice being sent to that user informing him or her that another requests to be allowed to follow. At that time, the target of the follow, who received the message, responds with "allow" or "disallow" as desired. When autofollow is set to "yes" for a particular user, all requests to follow are automatically allowed. When autofollow is set to "no" for a particular user, all requests to follow are automatically disallowed. The stopfollow command is directly tied to the follow command. The stopfollow command allows a user who is following to stop following, and allows a user who is being followed to stop another form following him or her. The autogoto command is directly tied to the goto command, and allows a user to set an automatic response to requests by others to go to him or her. The autogoto command takes a single argument selected from the following: ask, yes, and no. When the argument is "ask," any attempts to go to that user result in a notice being sent to that user informing him or her that another requests to be allowed to go to his or her current location. At that time, the target of the go to, who received the message, responds with "allow" or "disallow" as desired. When autogoto is set to "yes" for a particular user, all requests to follow are automatically allowed. When autogoto is set to "no" for a particular user, all requests to follow are automatically disallowed. The allow command enables users to respond to incoming goto or follow requests, and takes as its single argument the name of the user to whom permission to use goto or follow should be granted. The disallow command enables users to respond to incoming goto or follow requests, and takes as its single argument the name of the user to whom permission to use goto or follow should be denied.

Two additional movement commands are move and suggest. The move command, which is generally reserved for an administrator but which can be authorized to other users, allows this person to move one or more users into other rooms in the world. The suggest command is movement-like in that it allows a user a "peak" into another room or even another world by viewing an HTML page posted in the user's display window by the invoker of the command. The user and invoker remain in the current chat. The suggest command is also useful for displaying ad banners, which is achieved by designating the ad banner window default name ichatad.

The activity of managing and designing rooms in a virtual world and the various commands available are described in ichat ROOMS™ Administrator's Guide, IPN 960925.10.04, 1996, available from ichat, Inc. of Austin, Tex., which is hereby incorporated herein by reference in its entirety, and is included herein as an Appendix.

In an implementation of a chat server suitable for the Web, rooms are represented principally by separate URLs and are individual web-based (HTML) pages which may or may not be chat-enabled. Design of the URL to be displayed with each room is dictated primarily by the HTML designer's needs and the capabilities of the Web browser. Preferably, the chat and Web servers support all popular extensions, such as images, frames, plug-ins, Java® and JavaScript®, and ActiveX, and all popular multimedia extensions such as Real Audio, Shockwave, and Java Applets, and all can be synchronized with the chat and/or browse functions using the techniques described herein. Illustratively, the browser connection is an HTTP connection, and the chat connection is a telnet or IRC connection. Typically, an HTTP connection closes after document transfer completes, since current generation browsers such as Netscape® Navigators Version 3.0 and Microsoft® Explorer® Version 3.0 require that it be so. However, alternative technologies such as server push require that the http connection be maintained open, and may be used if desired. Typically, telnet and IRC connections remain open.

In an implementation of a chat server suitable for the Web, the chat client preferably is linked to the browser client for various reasons, including to establish a particular HTTP connection when the client is not the originator of the new connection request. For example, the chat server may need to cause a new HTTP connection to be made because a user object has just moved into a new room characterized by that connection. If the HTTP connection to the client is terminated, as is likely to be the case, the chat server cannot cause the HTTP server on the site to push the new document onto the browser client. However, the chat server is able to use the telnet or IRC connection to the chat client to make the request to load the new HTML page, and the request is then communicated by the chat client to the linked browser client which then pulls the new HTML page. If the HTTP connection happens to be open and the next HTML page is on the same site as the current HTML page, the browser server is able to push the HTML document onto the client browser if desired, or the transfer may rely on client pull.

Figure 7:
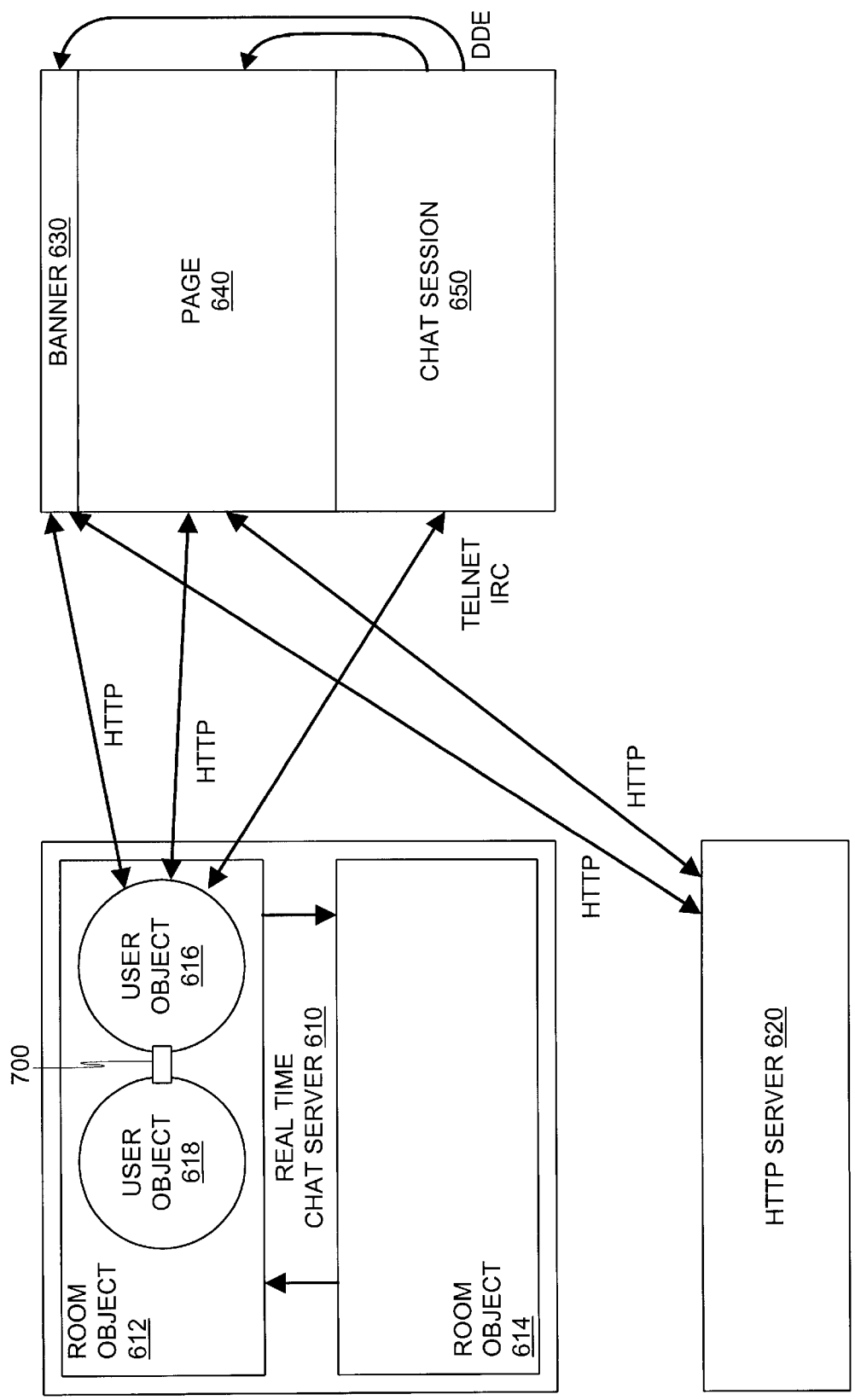
FIG. 7 is a block schematic diagram showing another state of a two room world and the relationships between a chat server, a Web server, and elements of the user's display.

FIG. 6 and FIG. 7 show an implementation of a world and the relationships between a chat server 610, an HTTP server 620, and the user's display, represented by a banner 630, an HTML page 640, and a chat 650. The world model of FIG. 6 and FIG. 7 is a simple two room world, for clarity, but is suitable for realizing the various events of FIG. 4 occurring on the Fixit! site, as follows.

Arrival at the Fixit! site is shown in FIG. 4C. At this time, the user object 616 is created in room object 614, which typically is an entry room. A user object 618 for Ralph the repair advisor resides in room object 612, but presently has nothing to do with the Ursula user object 616. Connections to the user object 618 are omitted for clarity. The user object 616 becomes fully aware of the web and chat connections that characterize the room object 614, thereby synchronizing the chat and browse functions. Other user objects associated with room object 614 are omitted for clarity.

The transition from FIG. 4C to FIG. 4D is caused by user Ursula clicking on the hyperlink "Chat with Rob the Receptionist" (action 421, FIG. 4C). This activity occurs within room object 614.

The transition from FIG. 4D to FIG. 4E is executed by Rob the Receptionists, who issues a move command to move Ursula into room object 612 (FIG. 7), which already has user object 612 resident. The user object 616 becomes fully aware of the web and chat connections that characterize the room object 612, thereby synchronizing the chat and browse functions. As a result, Ursula sees the HTML page 440 of Ralph the repair advisor and joins in the synchronized chat session 442.

The transitions from FIG. 4E to FIG. 4F, from FIG. 4F to FIG. 4G, and from FIG. 4G to FIG. 4H are executed by repair advisor Ralph using the suggest command to display new URLs 450, 460 and 470 on Ursula's browser screen while remaining in the object room 612 and continuing the same chat session 442. Each new URL is sent to the chat server 610, which sends information over the telnet or IRC connection to the chat application maintaining chat window 650, which in turn instructs the Web browser maintaining page 640 to load a new page. The chat application preferably uses local communications to the browser maintaining page 640 to load a new page corresponding to the new URL, although the chat application may be internal to the browser application if desired. A suitable local communications protocol is DDE, although other local communications protocols are suitable as well. The browser application establishes an HTTP connection to the appropriate server, which for this example is the HTTP server 620 although it could be a server on another site. Note that user object 616 remains in room object 612 (not shown).

The transition from FIG. 4H to FIG. 4I is executed by repair advisor Ralph using the suggest command to display new URLs 480 on Ursula's browser screen while remaining in the object room 612 and continuing the same chat session 442. This transition is similar to the transitions from FIG. 4E to FIG. 4F, from FIG. 4F to FIG. 4G, and from FIG. 4F to FIG. 4G, except that the HTTP connection is to a server on the BCD Computer site rather than to a server on the Fixit! site.

The transition from FIG. 4I to FIG. 4J is executed by repair advisor Ralph using the follow command to link his user object 618 to Ursula's user object 616, and then clicking on a hyperlink on the page 480 (action 481, FIG. 4I) to join in a chat with the BCD Computer technician Terri. Following another user is achieved by locking together user objects, as shown by the tie bar 700 linking user object 616 to user object 618. Linked user objects 616 and 618 are extinguished from room object 612 but are resurrected in another room in the world on the BCD Computer site (not shown).

Advertising banners such as 446 (FIG. 4E), 456 (FIG. 4F), 466 (FIG. 4G), 476 (FIG. 4H), 486 (FIG. 4I) and 630 (FIG. 6 and FIG. 7) are just small HTML windows and are handled in a similar fashion with one major exception. Preferably, banners are synchronized on a timed rotation, customizable by the second. The result is that users view multiple ad banners as often and for as long as configured by the Web site administrator.

The description of the invention set forth herein is illustrative, and does not limit the scope of the invention as set forth in the following claims. Variations and modifications of the embodiments disclosed herein are possible. These and other variations and modifications of the embodiments disclosed herein may be made without departing from the spirit of the invention and from the scope of the invention as set forth in the following claims.

What is claimed is:

1. A method for synchronizing browse and chat functions on a computer connected to a computer network, comprising:

establishing browser and chat regions on a first display device;

receiving a first document from a first document address through the computer network and, in response thereto, displaying the first document in the browser region;

receiving chat content from a first chat session through the computer network and, in response thereto, displaying the chat content in the chat region;

receiving a first request originating through a user's action in the chat region and, in response thereto, receiving a second document from a second document address through the computer network, and displaying the second document in the browser region;

receiving a second request originating through a user's action in the chat region and, in response thereto, changing content of the chat region from the first chat session to a second chat session, receiving a third document associated with the second chat session, and displaying the third document in the browser region;

receiving a third request originating from a user's action in the browser region and, in response thereto, changing content of the chat region from the first chat session to a third chat session; and receiving a fourth request originating from a user's action in the browser region and, in response thereto, changing content of the chat region from the first chat session to a fourth chat session, receiving a fourth document associated with the fourth chat session, and displaying the fourth document in the browser region.

2. The method of claim 1 wherein the establishing comprises:

establishing the chat region embedded in the browser region, the chat region being a real time continuously open bi-directional communications chat region.

3. The method of claim 2 wherein the establishing comprises:

establishing the chat region embedded in a Web page; and
   establishing the Web page embedded in the browser region.

4. The method of claim 1 wherein:

receiving a third request comprises
      in response to a change in the document address from the first document address to a second document address, changing the chat region from the first chat session to the third chat session, the third chat session being associated with the second document address.

5. The method of claim 1 wherein:

receiving a second request comprises
      in response to the change in the chat region from the first chat session to the second chat session, receiving a third document from a third document address through the computer network, and displaying the third document in the browser region, the third document address being associated with the second chat session.

6. The method of claim 1 further comprising:

establishing browser and chat regions on a second display device;

currently receiving a document through the computer network and, in response thereto, displaying the currently-received document in the browser region of the second display device;

currently receiving chat content from a chat session through the computer network and, in response thereto, displaying the currently-received chat content in the chat region of the second display device;

receiving a fifth request originating with a user of the second display device and, in response thereto, receiving through the computer network and displaying in the browser region of the first display device the document that is currently displayed in the browser region of the second display device, and receiving through the network and displaying in the chat region of the first display device the chat content that is currently displayed in the chat region of the second display device;

receiving a sixth request originating with a user of the second display device and, in response thereto, receiving through the computer network and displaying in the browser region of the first display device a document specified by the sixth request; and receiving a seventh request originating with a user of the second display device and, in response thereto, receiving through the computer network and displaying in the chat region of the first display device chat content from a chat session specified by the seventh request.

7. The method of claim 6 wherein receiving a sixth request further comprises:

receiving through the computer network and displaying in the chat region of the first display device chat content from a chat session corresponding to the document specified by the sixth request.

8. The method of claim 6 wherein receiving a seventh request further comprises:

receiving through the computer network and displaying in the browser region of the first display device a document corresponding to the chat session specified by the seventh request.

9. A system for synchronizing browse and chat functions on a computer network, comprising:

a first display device;

a first computer connected to the display device and to the computer network and for:

establishing browser and chat regions on the first display device;

receiving a first document from a first document address through the computer network and, in response thereto, causing the display device to display the first document in the browser region;

receiving chat content from a first chat session through the computer network and, in response thereto, causing the display device to display the chat content in the chat region; and receiving a first request originating from a user's action in the chat region and, in response thereto, receiving a second document from a second document address through the computer network, and causing the first display device to display the second document in the browser region;

receiving a second request originating through a user's action in the chat region and, in response thereto, causing the display device to change content of the chat region from the first chat session to a second chat session, receiving a third document associated with the second chat session, and causing the display device to display the third document in the browser region;

receiving a third request originating from a user's action in the browser region and, in response thereto, causing the display device to change content of the chat region from the first chat session to a third chat session; and receiving a fourth request originating from a user's action in the browser region and, in response thereto, causing the display device to change content of the chat region from the first chat session to a fourth chat session, receiving a fourth document associated with the fourth chat session, and causing the display device to display the fourth document in the browser region.

10. The system of claim 9 wherein the chat region is a real time continuously open bi-directional communications chat region embedded in the browser region.

11. The system of claim 10 wherein the chat region is embedded in a Web page, and the Web page is embedded in the browser region.

12. The system of claim 9 wherein:
the first computer's response to the third request comprises
in response to a change in the document address from the first document address to a second document address, changing the chat region from the first chat session to the third chat session, the third chat session being associated with the second document address.

13. The system of claim 9 wherein:
the first computer's response to the second request comprises
in response to the change in the chat region from the first chat session to the second chat session, receiving the third document from a third document address through the computer network, and causing the display device to display the third document in the browser region, the third document address being associated with the second chat session.

14. The system of claim 9 further comprising:
a second display device;
a second computer connected to the second display device and to the computer network and for:
establishing browser and chat regions on the second display device;
currently receiving a document through the computer network and, in response thereto, causing the second display device to display the currently-received document in the browser region of the second display device; and
currently receiving chat content from a chat session through the computer network and, in response thereto, causing the second display device to display the currently-received chat content in the chat region of the second display device; wherein
the first computer is further for:
in response to a fifth request originating with a user of the second computer, receiving through the computer network and causing displaying in the browser region of the first display device the document that is currently displayed in the browser region of the second display device, and receiving through the network and causing displaying in the chat region of the first display device the chat content that is currently displayed in the chat region of the second display device;
in response to a sixth request originating with a user of the second computer, receiving through the computer network and causing displaying in the browser region of the first display device a document specified by the sixth request; and
in response to a seventh request originating with a user of the second computer, receiving through the computer network and causing displaying in the chat region of the first display device chat content from a chat session specified by the seventh request.

15. The system of claim 14 wherein the first computer further responds to the a sixth request by:
receiving through the computer network and causing displaying in the chat region of the first display device chat content from a chat session corresponding to the document specified by the sixth request.

16. The system of claim 14 wherein the first computer further responds to the seventh request by:
receiving through the computer network and causing displaying in the browser region of the first display device a document corresponding to the chat session specified by the seventh request.

17. A computer program product, comprising:
a computer application processable by a first computer for causing the computer to:
establish browser and chat regions on a first display device;
receive a first document from a first document address through a computer network and, in response thereto, cause the display device to display the first document in the browser region;
receive chat content from a first chat session through the computer network and, in response thereto, cause the display device to display the chat content in the chat region;
receive a first request originating from a user's action in the chat region and, in response thereto, receive a second document from a second document address through the computer network, and cause the display device to display the second document in the browser region;
receive a second request originating from a user's action in the chat region, and in response thereto, cause the display device to change content of the chat region from the first chat session to a second chat session, receive a third document associated with the second chat session, and cause the display device to display the third document in the browser region;
receive a third request originating from a user's action in the browser region and, in response thereto, cause the display device to change content of the chat region from the first chat session to a third chat session; and
receive a fourth request originating from a user's action in the browser region and, in response thereto, cause the display device to change content of the chat region from the first chat session to a fourth chat session, receive a fourth document associated with the fourth chat session, and cause the display device to display the fourth document in the browser region; and apparatus from which the computer application is accessible by the first computer.

18. The computer program product of claim 17 wherein the chat region is a real time continuously open bi-directional communications chat region embedded in the browser region.

19. The computer program product of claim 18 wherein the chat region is embedded in a Web page, and the Web page is embedded in the browser region.

20. The computer program product of claim 17 wherein the computer application causes the computer to respond to the third request as follows:

in response to a change in the document address from the first document address to a second document address, change the chat region from the first chat session to the third chat session, the third chat session being associated with the second document address.

21. The computer product of claim 17 wherein the computer application causes the computer to respond to the second request as follows:

in response to a change in the chat region from the first chat session to the second chat session, receive the third document from a third document address through the computer network, and cause the display device to display the third document in the browser region, the third document address being associated with the second chat session.

22. The computer program product of claim 17 further comprising:

a computer application processable by a second computer for causing the second computer to:

establish browser and chat regions on a second display device;

currently receive a document through the computer network and, in response thereto, cause the second display device to display the currently-received document in the browser region of the second display device; and currently receive chat content from a chat session through the computer network and, in response thereto, cause the second display device to display the currently-received chat content in the chat region of the second display device; wherein the computer application processable by the first computer is further for causing the first computer to:

in response to a fifth request originating with a user of the second computer, receive through the computer network and cause displaying in the browser region of the first display device the document that is currently displayed in the browser region of the second display device, and receive through the network and cause displaying in the chat region of the first display device the chat content that is currently displayed in the chat region of the second display device;

in response to a sixth request originating with a user of the second computer, receive through the computer network and cause displaying in the browser region of the first display device a document specified by the sixth request; and in response to a seventh request originating with a user of the second computer, receive through the computer network and cause displaying in the chat region of the first display device chat content from a chat session specified by the seventh request.

23. The computer program product of claim 22 wherein the computer application processable by the first computer is further for causing the first computer to:

receive through the computer network and cause displaying in the chat region of the first display device chat content from a chat session corresponding to the document specified by the sixth request, in response to the sixth request.

24. The computer program product of claim 22 wherein the computer application processable by the first computer is further for causing the first computer to:

receive through the computer network and cause displaying in the browser region of the first display device a document corresponding to the chat session specified by the seventh request, in response to the seventh request.

* * * * *